United States Patent
Nagori et al.

(10) Patent No.: US 10,798,379 B2
(45) Date of Patent: *Oct. 6, 2020

(54) INTRA/INTER MODE DECISION FOR PREDICTIVE FRAME ENCODING

(71) Applicant: TEXAS INSTRUMENTS INCORPORATED, Dallas, TX (US)

(72) Inventors: Soyeb Nagori, Bangalore (IN); Manu Mathew, Kerala (IN); Pramod Kumar Swami, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,350

(22) Filed: Dec. 20, 2018

(65) Prior Publication Data

US 2019/0124326 A1   Apr. 25, 2019

Related U.S. Application Data

(63) Continuation of application No. 15/419,512, filed on Jan. 30, 2017, now Pat. No. 10,165,270, which is a continuation of application No. 12/751,211, filed on Mar. 31, 2010, now Pat. No. 9,560,350.

(60) Provisional application No. 61/165,213, filed on Mar. 31, 2009.

(51) Int. Cl.
*H04N 19/107*    (2014.01)
*H04N 19/50*    (2014.01)
*H04N 19/176*    (2014.01)
*H04N 19/147*    (2014.01)

(52) U.S. Cl.
CPC ......... *H04N 19/107* (2014.11); *H04N 19/147* (2014.11); *H04N 19/176* (2014.11); *H04N 19/50* (2014.11)

(58) Field of Classification Search
None
See application file for complete search history.

(56) References Cited

U.S. PATENT DOCUMENTS

| | | | |
|---|---|---|---|
| 5,740,278 | A | 4/1998 | Berger et al. |
| 2005/0068465 | A1 | 3/2005 | Van Dijk |
| 2006/0133500 | A1 | 6/2006 | Lee et al. |
| 2008/0273588 | A1 | 11/2008 | Wang |
| 2009/0190660 | A1 | 7/2009 | Kusakabe et al. |
| 2009/0304271 | A1 | 12/2009 | Takahashi |

*Primary Examiner* — Frederick D Bailey
(74) *Attorney, Agent, or Firm* — Ebby Abraham; Charles A. Brill; Frank D. Cimino (57) ABSTRACT

This invention predicts that intra mode prediction is more effective for the macroblocks where motion estimation in inter mode prediction fails. This failure is indicated by a large value of the inter mode SAD. This invention performs intra mode prediction for only macro blocks have larger inter mode SADs. The definition of a large inter mode SAD differs for different content. This invention compares the inter mode SAD of a current macroblock with an adaptive threshold. This adaptive threshold depends on the average and variance of the SADs of the previous predicted frame. An adaptive threshold is calculated for each new predictive frame.

18 Claims, 4 Drawing Sheets

FIG. 1
(PRIOR ART)

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

INTRA/INTER MODE DECISION FOR PREDICTIVE FRAME ENCODING

CROSS-REFERENCE TO RELATED APPLICATIONS

This application is a continuation of U.S. patent application Ser. No. 15/419,512 filed on Jan. 30, 2017, which is a continuation of U.S. patent application Ser. No. 12/751,211 filed on Mar. 31, 2010 (now U.S. Pat. No. 9,560,350), which claims priority to U.S. Provisional Application No. 61/165,213 filed Mar. 31, 2009, all of which are incorporated herein by reference.

TECHNICAL FIELD

The technical field of this invention is video encoding.

BACKGROUND

Spatial domain intra mode prediction an important tool in advanced video coding standards such as H.264 and AVS which improve coding efficiency over older standards. The H.264 intra prediction allows three modes, intra 16×16 (I16×16), intra 8×8 (I8×8) and intra 4×4 (I4×4) based on the prediction block size. For a predictive frame the encoder decides to encode a macroblock in the intra mode when motion estimation and the inter mode prediction fail to find a good match from the reference frame. The encoder computes a measure of similarity for both the best intra prediction mode and the best inter prediction mode. This measure of similarity is often the sum of absolute differences (SAD). The encoder then selects the mode with minimum SAD (best similarity). The computation of SAD for best intra prediction mode is not trivial and requires several arithmetic operations to search through all the allowed intra prediction modes. When using dedicated memory based hardware architecture with different hardware accelerators for intra mode and inter mode prediction, there will be additional transfer of data from external memory to hardware accelerator internal memory to compute intra prediction SAD. Switching off intra mode search completely results in noticeable video quality artifacts. Thus there is a need in the art to reduce the computational complexity and data transfer needs of intra prediction.

SUMMARY OF THE INVENTION

Statistical data shows intra mode macroblock coding is best when the inter mode macroblock SAD is very high. This invention uses this condition. Rather than computing the intra mode SAD for all macroblocks of a predictive frame, this invention computes the intra mode SAD for only some macroblocks. The inter mode SAD computation should be pipelined before intra mode SAD computation to realize the best performance gain.

For macroblocks where the inter mode SAD is smaller than a predetermined constant, the intra mode SAD is not computed. Such macroblocks are coded in the inter mode. For other macroblocks both the intra mode SAD and the inter mode SADs are computed. The encoder selects the encoding type based on comparison of these SAD computations.

The constant FastIntraThreshold is calculated from the macroblock pre pixel inter mode SAD averaged over the entire frame and its variance. The average and variance from previous predictive frame are used in the calculation for the current frame. The average and variance of the current frame would not be known until entire frame is encoded. Thus calculating FastIntraThreshold based upon the current frame introduces a "chicken-egg" problem.

This calculation of FastIntraThreshold includes a quality factor. Increasing the quality factor increases the proportion of macroblocks which are intra mode searched. This provides better quality but results in smaller computational reduction. The preferred embodiment includes six possible quality factor levels used in varying image conditions.

BRIEF DESCRIPTION OF THE DRAWINGS

These and other aspects of this invention are illustrated in the drawings, in which.

DETAILED DESCRIPTION

Figure 1:
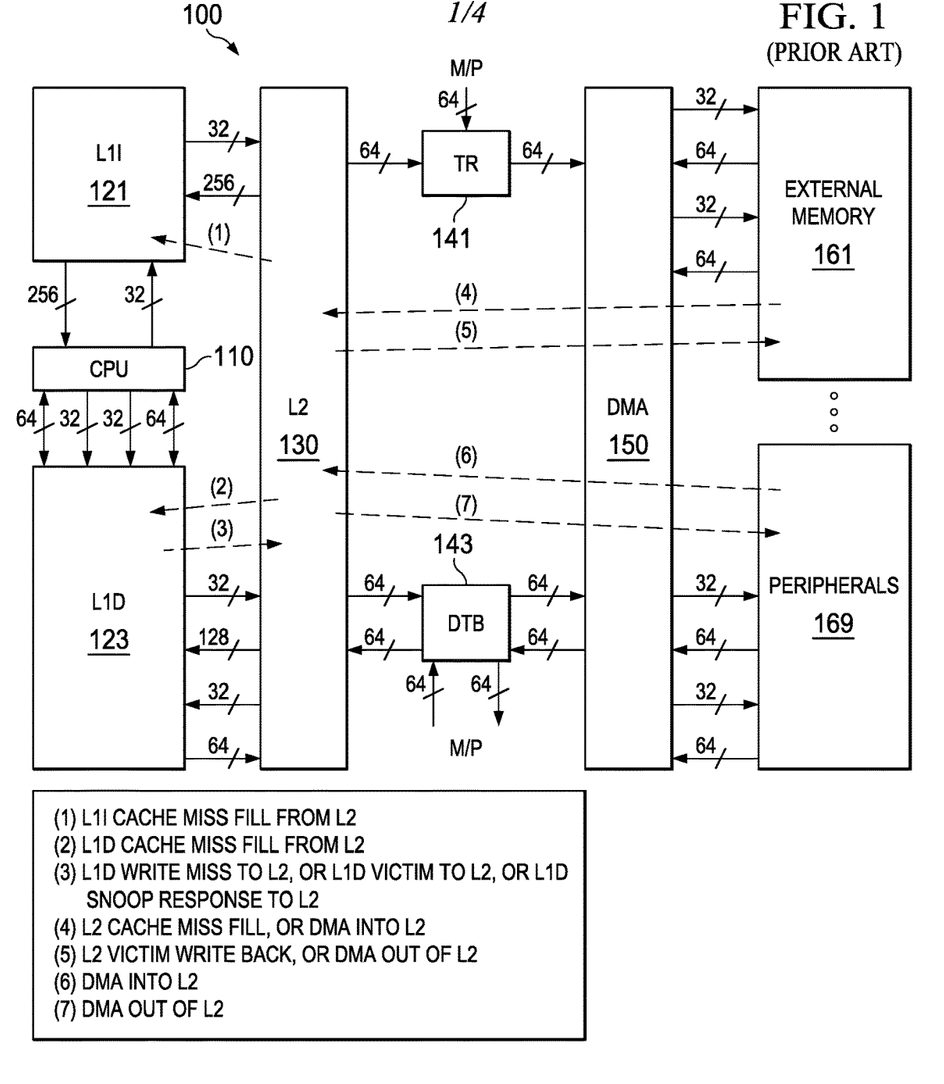
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
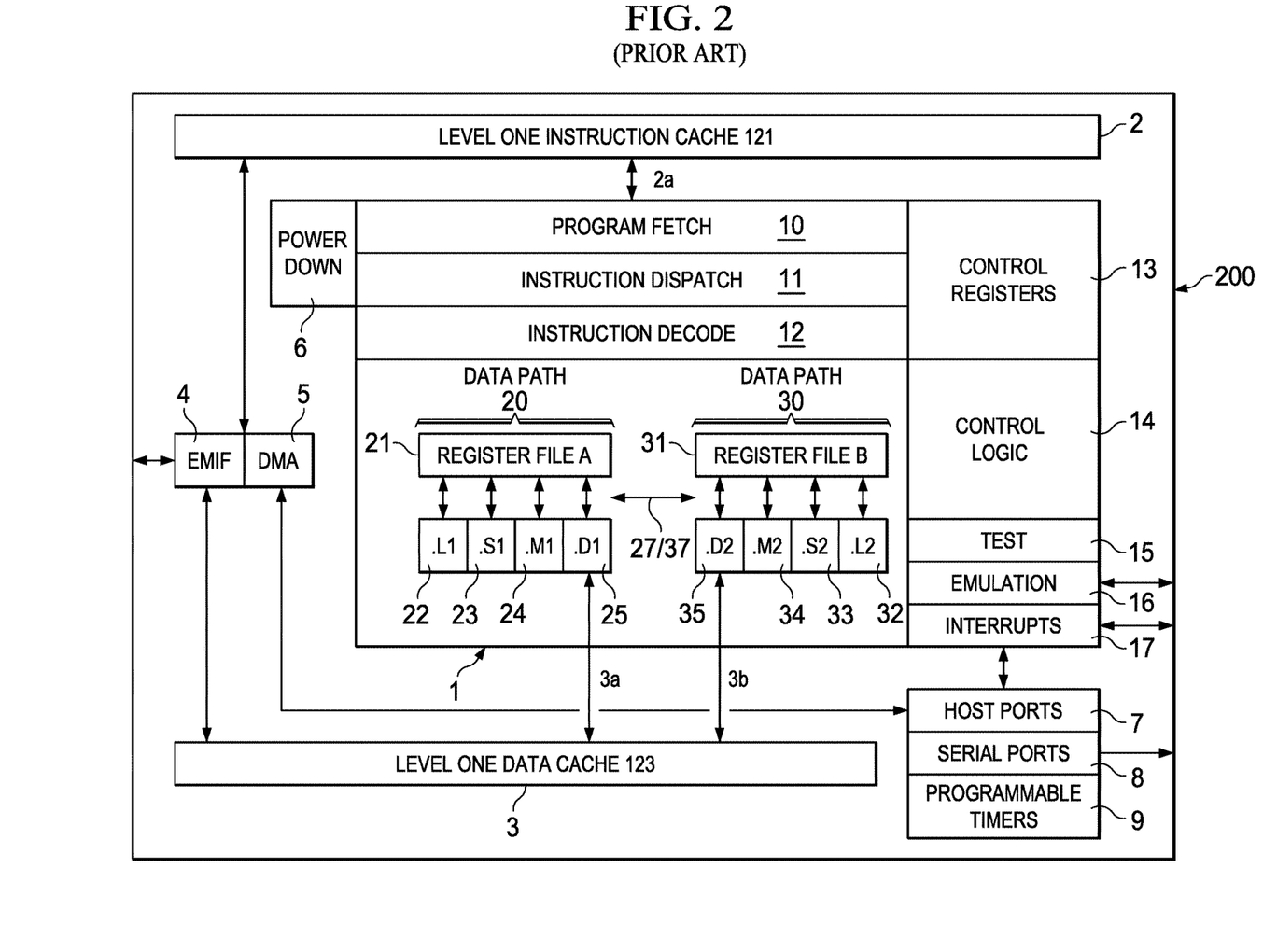
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction.

The data paths are further described below. A control register file 13 provides the means to configure and control various processor operations.

Figure 3:
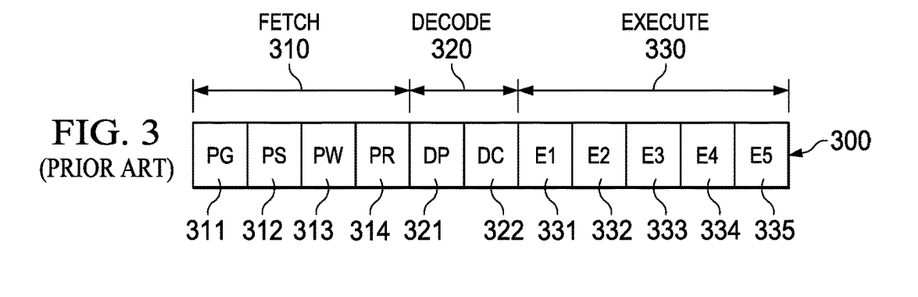
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figure 4:
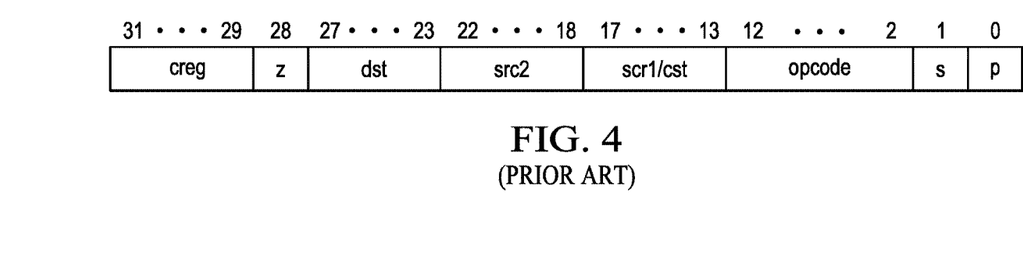
FIG. 4 illustrates the instruction syntax of the very long instruction word digital signal processor core illustrated in FIG. 2 (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 2 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 2 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Figure 5:
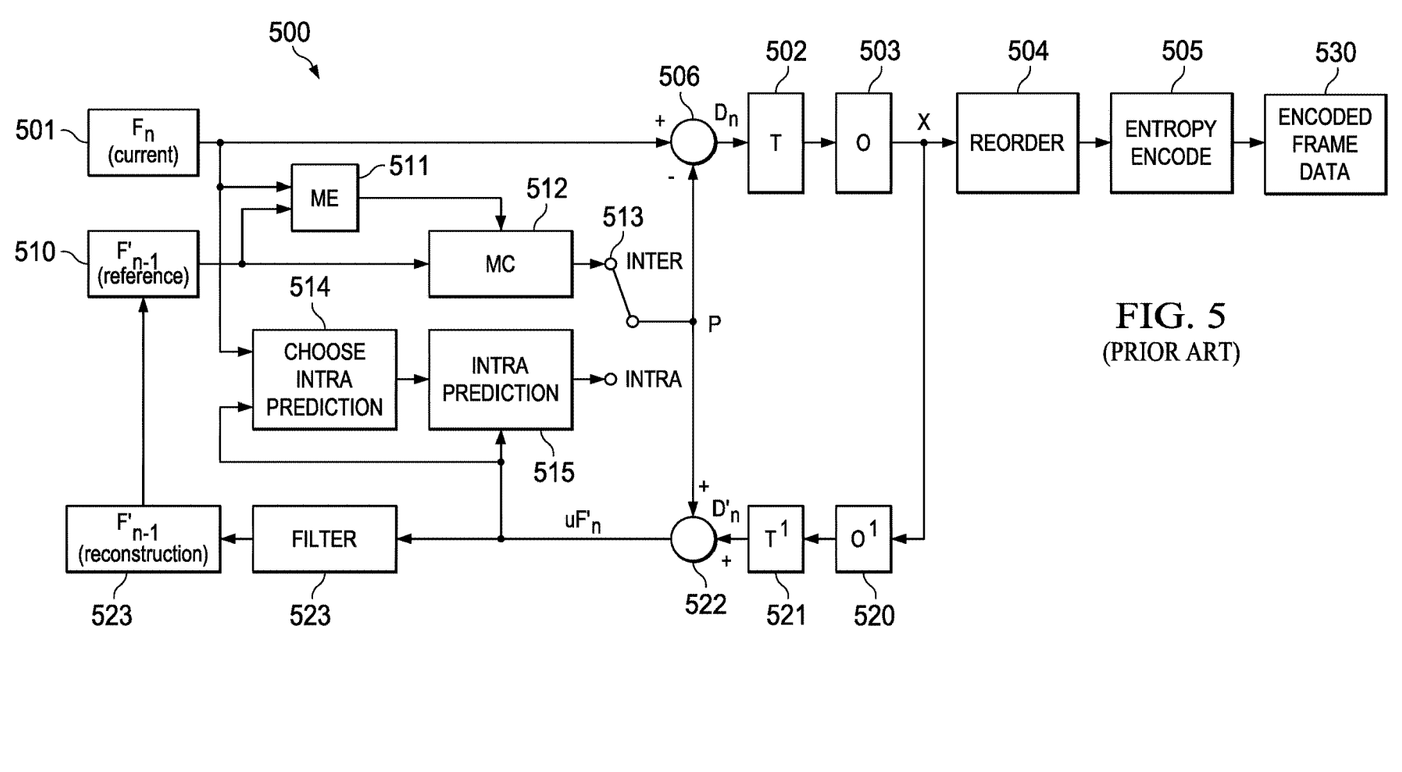
FIG. 5 illustrates an overview of the video encoding process of the prior art.

FIG. 5 illustrates the encoding process 500 of video encoding according to the prior art. Many video encoding standards use similar processes such as represented in FIG. 5. In accordance with the known art a digital signal processor such as described above in conjunction with FIGS. 1 to 4 is programmed to implement encoding process 500. Encoding process 500 begins with input of the n th (current) frame $F_n$ 501. This entire input frame is stored in a corresponding memory or set of memory locations. The result of encoding process 500 is the output of encoded frame data 530 from entropy encoder 505. Frequency transform block 502 transforms a macroblock of the pixel data into the spatial frequency domain. This typically involves a discrete cosine transform (DCT). This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. This reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the output encoded frame data 530.

Video encoding standards typically permit two types of predictions. In inter-frame prediction, data is compared with data from the corresponding location of another frame. In intra-frame prediction, data is compared with data from another location in the same frame.

For inter prediction, data from n−1 th (previous) frame $F_{n-1}$ 510 and data from the n th frame $F_n$ 501 supply motion estimation block 511. Motion estimation block 511 determines via a search the positions and motion vectors of moving objects within the picture. This motion data is supplied to motion compensation block 512 along with data from n−1 th frame $F_{n-1}$ 510. The resulting motion compensated frame data is selected by switch 513 for application to subtraction unit 506. Subtraction unit 506 subtracts the inter prediction data from switch 513 from the input frame data from n th frame $F_n$ 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If the n th frame $F_n$ and the n−1 th frame $F_{n-1}$ are identical, the subtraction unit 506 will produce a string of zeros for data. This data string can be encoded using few bits.

The second type of prediction is intra prediction. Intra prediction predicts a macroblock of the current frame from another macroblock of the current frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement intra prediction. Choose intra prediction unit 514 receives data from n th frame $F_n$ 501 and the output of addition unit 522. Choose intra prediction unit 514 signals intra predication unit 515, which also receives the output of addition unit 522. Switch 513 selects the intra prediction output for application to the subtraction input of subtraction unit 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors. This invention concerns the operation of choose intra prediction unit 514.

Video encoders typically periodically transmit unpredicted frames. In such an event the predicted frame is all 0's. Subtraction unit 506 thus produces data corresponding to the n th frame $F_n$ 501 data. Periodic unpredicted or I frames limits any drift between the transmitter coding and the receive decoding. In a video movie a scene change may produce such a large change between adjacent frames that differential coding provides little advantage. Transmitting an unpredicted frame upon a scene change would thus not be disadvantageous. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblock filter 523 smoothes artifacts created by the block and macroblock nature of the encoding process. The result is reconstructed frame $F'_n$ 524. As shown schematically in FIG. 5, this reconstructed frame $F'_n$ 524 becomes the next reference frame $F_{n-1}$ 510.

The prior art generally performs choose intra prediction 514 by computing the intra mode SAD and the inter mode SAD for each macroblock. Choose intra prediction 510 chooses the mode with minimum SAD value which corresponds to the best similarity. This invention avoids intra mode SAD calculation and search for macroblocks in cases where the inventors estimate inter mode coding will result in reduced video quality. This prediction is based on a comparison between inter mode SAD statistics of the previous frame and inter mode SAD of the current macroblock.

This invention preferably avoids intra mode search for at least 50% of macroblocks. For dedicated memory based hardware accelerator based systems this invention significantly reduces data transfer bandwidth for these macroblocks. These macroblocks require no data transfer from external memory to dedicated memory of hardware accelerator. For the programmable DSP based systems this means reduction in DSP cycles because intra 4×4 and intra 8×8 modes are a significant portion of overall encoding cycles. This invention also reduces power consumed by the encoder. This invention is an important factor in achieving real time encoding at 30 frames per second.

Figure 6:
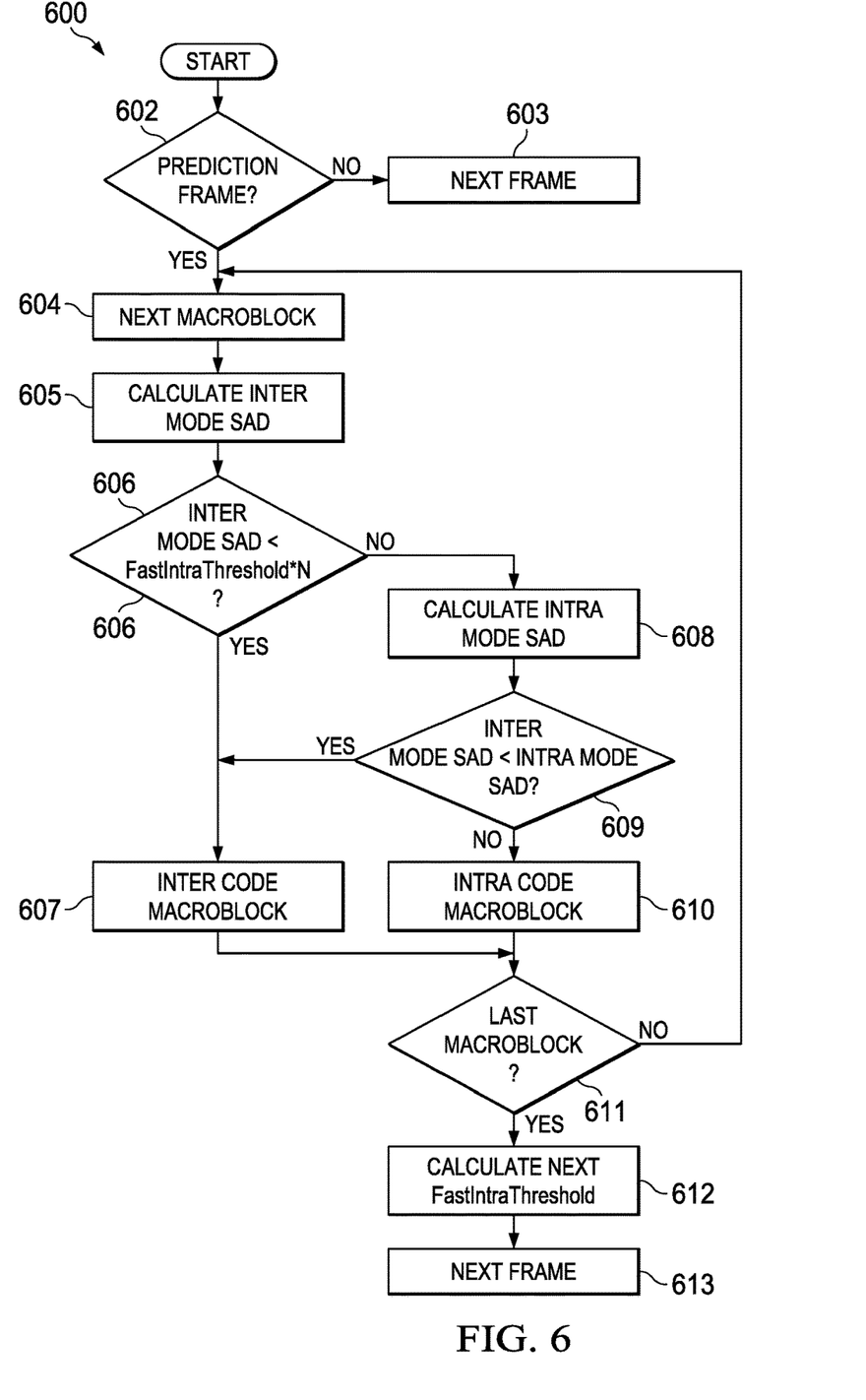
FIG. 6 is a flow chart of process for determining inter or intra mode prediction for a particular frame.

FIG. 6 illustrates program 600 which is an example of this invention. Program 600 shows the process of this invention for each video frame of a video being encoded. The processes of program 600 generally take place within the choose intra prediction unit 514 except as noted below. In the preferred embodiment a digital signal processor such as shown above in conjunction with FIGS. 1 to 4 is programmed to implement program 600. However, important parts of program 600 may be performed by suitable hardware accelerators. Program 600 begins with start block 601. According to this example, program 600 starts again for each new frame of the video being encoded. Test block 602 determines whether the current frame is a predictive frame. If this is not the case (No at test block 602), then this invention is not applicable. Program 600 exits at next frame block 603. The video encoder proceeds with other processes such as those illustrated in FIG. 5 for production of encoded frame data 530.

If the current frame is a predictive frame (Yes at test block 602), then the current invention is applicable. Block 604 proceeds to the next macroblock of the current frame. When starting a new frame, this next macroblock is the first macroblock in the current frame. It is conventional to consider macroblocks within a particular frame in raster scan order. Block 605 calculates a best SAD for the current macroblock in the inter mode. This corresponds to motion estimation block 511 determining the motion vector and motion compensation block 512 calculating the best SAD.

Test block 606 compares the best inter mode SAD with the constant FastIntraThreshold*N. In this example N is the number of pixels per macroblock, generally 256. The calculation of FastIntraThreshold in equation (5) below is a per pixel value and multiplication by N converts this to a per macroblock value for this comparison. In accordance with this invention, a inter mode SAD less than FastIntraThreshold*N is expected to correlate with a low probability that a better intra mode SAD is possible. Thus if the inter mode SAD is less than FastIntraThreshold*N (Yes at test block 606), then this invention skips intra mode SAD calculation. Program 600 proceeds to block 607 which completes the process of inter mode encoding the current macroblock. This is equivalent to switch 513 selecting the inter position and supplying the corresponding prediction data for the current macroblock to subtraction unit 506 and addition unit 522.

If the inter mode SAD is not less than FastIntraThreshold*N (No at test block 606), then block 608 performs intra mode SAD calculation for the current macroblock. In accordance with this invention, a inter mode SAD greater than FastIntraThreshold*N expected to correlate with a high probability that a better intra mode SAD is possible. Thus program 600 performs the calculation of intra mode SAD for the current macroblock at block 608. Test block compares the best inter mode SAD from block 605 with the best intra mode SAD from block 608. In accordance with the prior art, this comparison determines the encoding type for the current macroblock. If the best inter mode SAD is less than the best intra mode SAD (Yes at test block 609), then program 600 advances to block 607 to inter code the current macroblock. If the best inter mode SAD is not less than the best intra mode SAD (No at test block 609), then program 600 advances to block 619 to intra code the current macroblock.

Following completion of inter coding in block 607 or intra coding in block 610, test block 611 determines whether the current macroblock is the last macroblock in the frame. If the current macroblock is not the last macroblock in the frame (No at test block 611), the program 600 advances to block 604 to consider the next macroblock. Program 600 remains in this loop until the current macroblock is the last macroblock (Yes at test block 611).

If the current macroblock is the last macroblock in the frame (Yes at test block 611), then block 612 calculates FastIntraThreshold for the next predictive frame. As noted above this calculation is based upon the average macroblock SAD and average variance in macroblock SAD of the current frame. The average macroblock SAD value is:

$$avg\_sad = \frac{1}{M} \sum_{i=1}^{M} sad[i] \qquad (1)$$

where: M is the number of macroblocks in the frame; and sad[i] is the calculated inter mode SAD for the i th macroblock. The variance in macroblock SAD is calculated as follows:

$$var\_sad = \frac{1}{M} \sum_{i=1}^{M} (sad[i] - avg\_sad)^2 \qquad (2)$$

The actual computations are based upon average SAD per pixel and variance per pixel calculated as follows:

$$avg\_sad\_pp = \frac{avg\_sad}{N} \qquad (3)$$

$$var\_sad\_pp = \frac{var\_sad}{N^2} \qquad (4)$$

where: N is the number of pixels per macroblock which is generally 256. The new value of FastInterThreshold for the next frame is:

$$FastIntraThrehold[n]=(1-QF*var\_sad\_pp[n-1]) *avg\_sad\_pp[n-1] \qquad (5)$$

where: QF is an empirical quality factor preferably selected from a set of 6 possible quality factor levels. The preferred values for the six QF levels from 0 to 5 are shown in Table 3.

TABLE 2

| Quality Factor Level | FastIntraThreshold |
|---|---|
| 0 | INT_MAX |
| 1 | QF = 1/100 |
| 2 | QF = 2/100 |
| 3 | QF = 3/100 |
| 4 | QF = 4/100 |
| 5 | 0 |

A quality factor level 0 eliminates all intra mode SAD computations. No macroblocks are intra coded. This provides the lowest computational overhead and the least expected quality. For a quality factor level 5 intra mode SAD computations occur for all macroblocks. This is expected to yield the greatest video quality at the expense of the greatest computational overhead. Increasing the quality factor from 0 toward 5 increases the percentage of macroblocks subject to intra mode SAD calculation. Such an increase in quality factor level is expected to increase the computational overhead. Program 600 exits to the next frame via block 613 upon calculation of the next FastIntraThreshold.

In an H.264 encoder using a digital signal processor as described above in conjunction with FIGS. 1 to 5 intra mode prediction generates around 600 Bytes of DDR traffic for each macroblock. This amount of memory traffic may prevent real time encoding at 30 frames per second (fps). This invention reduces DDR bandwidth by selectively performing intra mode prediction. This invention makes a fast intra mode decision algorithm to accomplish this.

Experimental results show large video quality degradation on complete removal of intra mode coded macroblocks. Selecting the quality factor level to eliminate 40% to 60% of the intra mode coded macroblocks results in good combination of reduced computation and minimized video quality degradation. The quality factor level 2 selects best tradeoff in terms of video quality degradation and performance improvement. This avoids intra prediction estimation for about 55% macroblocks with very small degradation of 0.01 db on average and worst case degradation of 0.04 db in perceived signal to noise ratio (PSNR) in the encoded video.

This invention predicts that intra mode prediction is more effective for the macroblocks where motion estimation in inter mode prediction fails. This failure is indicated by a large value of the inter mode SAD. This invention performs intra mode prediction for only macroblocks having larger inter mode SADs. The definition of a large inter mode SAD differs for different content. This invention compares the inter mode SAD of a current macroblock with an adaptive threshold. This adaptive threshold depends on the average and variance of the SADs of the previous predicted frame. An adaptive threshold is calculated for each frame.

What is claimed is:

1. A method for encoding video data having a plurality of frames, the method comprising:
for each frame of the plurality of frames:
dividing the respective frame into a plurality of coding units (CU) and, for each CU of the plurality of CUs:
determining an inter mode similarity measurement for the CU;
comparing the inter mode similarity measurement for the CU to a threshold determined based on another inter mode similarity measurement corresponding to inter mode predictive encoding of a first frame that precedes the respective frame using a second frame that precedes the first frame;
if the inter mode similarity measurement for the CU is less than the threshold, applying inter mode predictive coding to encode the CU; and
if the inter mode similarity measurement for the CU is not less than the threshold, then:
calculating an intra mode similarity measurement for the CU;
comparing the inter mode similarity measurement for the CU to the intra mode similarity measurement for the CU;
if the inter mode similarity measurement for the CU is less than the intra mode similarity measurement for the CU, applying inter mode predictive coding to encode the CU; and
if the inter mode similarity measurement for the CU is not less than the intra mode similarity measurement for the CU, applying intra mode predictive coding to encode the CU.

2. The method of claim 1, wherein the inter mode similarity measurement is a sum of absolute difference (SAD) measurement.

3. A method for encoding video data having a plurality of frames, the method comprising:

for each frame of the plurality of frames:
dividing the frame into a plurality of coding units (CUs) and, for each CU of the plurality of CUs:
determining an inter mode similarity measurement for the CU;
comparing the inter mode similarity measurement for the CU to a threshold determined based at least partially on inter mode similarity measurements of one or more CUs of an immediately preceding frame, wherein the threshold is determined based on:
an average of the inter mode similarity measurements of all CUs of the immediately preceding frame; and
a variance of the inter mode similarity measurements of all CUs of the immediately preceding frame;
if the inter mode similarity measurement for the CU is less than the threshold, applying inter mode predictive coding to encode the CU; and
if the inter mode similarity measurement for the CU is not less than the threshold, then:
calculating an intra mode similarity measurement for the CU;
comparing the inter mode similarity measurement for the CU to the intra mode similarity measurement for the CU;
if the inter mode similarity measurement for the CU is less than intra mode similarity measurement for the CU, applying inter mode predictive coding to encode the CU; and
if the inter mode similarity measurement for the CU is not less than the intra mode similarity measurement for the CU, applying intra mode predictive coding to encode the CU.

4. The method of claim 3, wherein:
the average of the inter mode similarity measurements of all CUs of the immediately preceding frame is an average of inter mode sum of absolute difference (SAD) measurements for all CUs of the immediately preceding frame (avg_sad) determined as:

$$\mathrm{avg\_sad} = \frac{1}{M}\sum_{i=1}^{M} sad[i],$$

wherein M is the number of all the CUs in the immediately preceding frame and sad[i] is the inter mode SAD measurement for the i-th CU of the immediately preceding frame; and
the variance of the inter mode similarity measurements of all CUs of the immediately preceding frame is a variance of the inter mode SAD measurements for all CUs of the immediately preceding frame (var_sad) determined as:

$$\mathrm{var\_sad} = \frac{1}{M}\sum_{i=1}^{M} (sad[i] - \mathrm{avg\_sad})^2.$$

5. The method of claim 4, wherein the threshold is determined by:
calculating an average inter mode SAD measurement per pixel for the immediately preceding frame (avg_sad_pp) as $$\mathrm{avg\_sad\_pp} = \frac{\mathrm{avg\_sad}}{N};$$

and
calculating a variance in inter mode SAD measurement per pixel for the immediately preceding frame (var_sad_pp) as $$\mathrm{var\_sad\_pp} = \frac{\mathrm{var\_sad}}{N^2};$$

wherein N is the number of pixels per CU of the immediately preceding frame, and wherein the threshold is based on both avg_sad_pp for the immediately preceding frame and var_sad_pp for the immediately preceding frame.

6. The method of claim 5, wherein the threshold is determined as a product of a first term that includes the var_sad_pp for the immediately preceding frame and a second term equal to avg_sad_pp for the immediately preceding frame.

7. The method of claim 6, wherein the first term further includes an empirical quality factor (QF).

8. The method of claim 7, wherein the threshold is calculated as equal to:

$$(1-\mathrm{QF}(\mathrm{var\_sad\_pp}[n-1]))\times(\mathrm{avg\_sad\_pp}[n-1]),$$

wherein n−1 is the immediately preceding frame.

9. The method of claim 8, wherein the empirical quality factor is selected from a set {0, 1, 2, 3, 4, 5}, wherein, when the empirical quality factor is selected as 0, intra mode coding is not used for any CUs of the frame, and wherein, when the empirical quality factor is selected as 5, intra mode coding used for all CUs of the frame.

10. A method of transforming an input video into an encoded video, the method comprising:
receiving a plurality of sequential frames corresponding to the input video;
dividing each frame into a plurality of macroblocks;
for each frame, coding each macroblock by:
calculating an inter mode similarity measurement for inter mode predictive coding of the macroblock;
comparing the inter mode similarity measurement with a threshold, wherein the threshold is determined as a function of an average of inter mode similarity measurements of macroblocks of an immediately preceding frame and a variance of the inter mode similarity measurements of the macroblocks of the immediately preceding frame;
if the inter mode similarity measurement is less than the threshold, then inter mode predictive coding the macroblock; and
if the inter mode similarity measurement is not less than the threshold, then:
calculating an intra mode similarity measurement for intra mode predictive coding of the macroblock;
comparing the inter mode similarity measurement with the intra mode similarity measurement;

if the inter mode similarity measurement is less than the intra mode similarity measurement, then inter mode predictive coding the macroblock; and if the inter mode similarity measurement is not less than the intra mode similarity measurement, then intra mode predictive coding the macroblock.

11. The method of claim 10, comprising outputting the coded plurality of macroblocks of each frame as part of the encoded video.

12. The method of claim 10, wherein the inter mode similarity measurement is a sum of absolute difference (SAD) measurement.

13. The method of claim 12, wherein:

the average of the inter mode similarity measurements of macroblocks of the immediately preceding frame is an average of inter mode SAD measurements of macroblocks of the immediately preceding frame (avg_sad) determined as:

$$\text{avg\_sad} = \frac{1}{M}\sum_{i=1}^{M} sad[i],$$

M is a number of macroblocks in the immediately preceding frame and sad[i] is the calculated inter mode SAD measurement for the i-th macroblock of the immediately preceding frame; and the variance of the inter mode similarity measurements of the macroblocks of the immediately preceding frame is a variance of the inter mode SAD measurements of macroblocks of the immediately preceding frame (var_sad) determined as:

$$\text{var\_sad} = \frac{1}{M}\sum_{i=1}^{M} (sad[i] - \text{avg\_sad})^2.$$

14. The method of claim 13, wherein the threshold is determined by calculating an average inter mode SAD measurement per pixel for the immediately preceding frame (avg_sad_pp) as $$\text{avg\_sad\_pp} = \frac{\text{avg\_sad}}{N};$$

and calculating a variance in inter mode SAD measurement per pixel for the immediately preceding frame (var_sad_pp) as $$\text{var\_sad\_pp} = \frac{\text{var\_sad}}{N^2};$$

wherein N is the number of pixels per macroblock of the immediately preceding frame, and wherein the threshold is based on both avg_sad_pp for the immediately preceding frame and var_sad_pp for the immediately preceding frame.

15. The method of claim 14, wherein the threshold is determined as a product of a first term that includes the var_sad_pp for the immediately preceding frame and a second term equal to avg_sad_pp for the immediately preceding frame.

16. The method of claim 15, wherein the first term further includes an empirical quality factor (QF).

17. The method of claim 16, wherein the threshold is calculated as equal to:

(1−QF(var_sad_pp[n−1]))×(avg_sad_pp[n−1]), wherein n−1 is the immediately preceding frame.

18. The method of claim 16, wherein:

the empirical quality factor is selected from a set {0, 1, 2, 3, 4, 5};

when the empirical quality factor is selected as 0, intra mode coding is not used for any macroblocks; and when the empirical quality factor is selected as 5, intra mode coding used for all macroblocks.

* * * * *